UNITED STATES PATENT OFFICE.

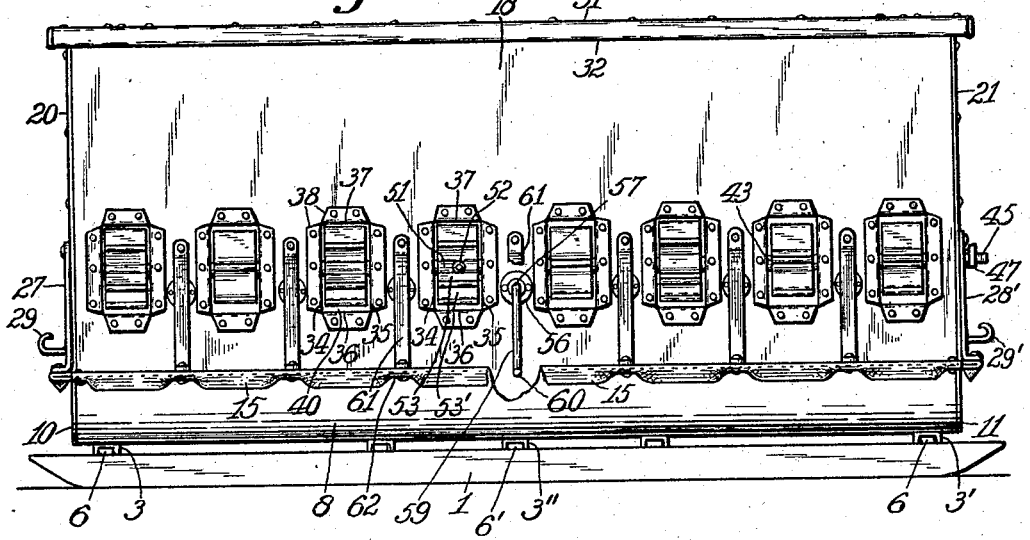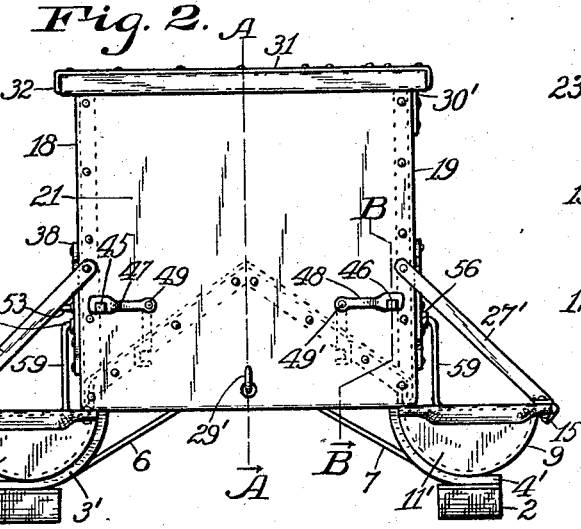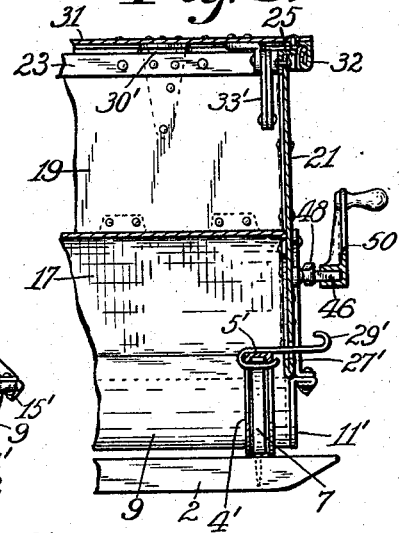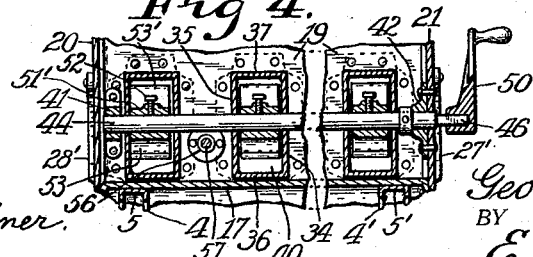

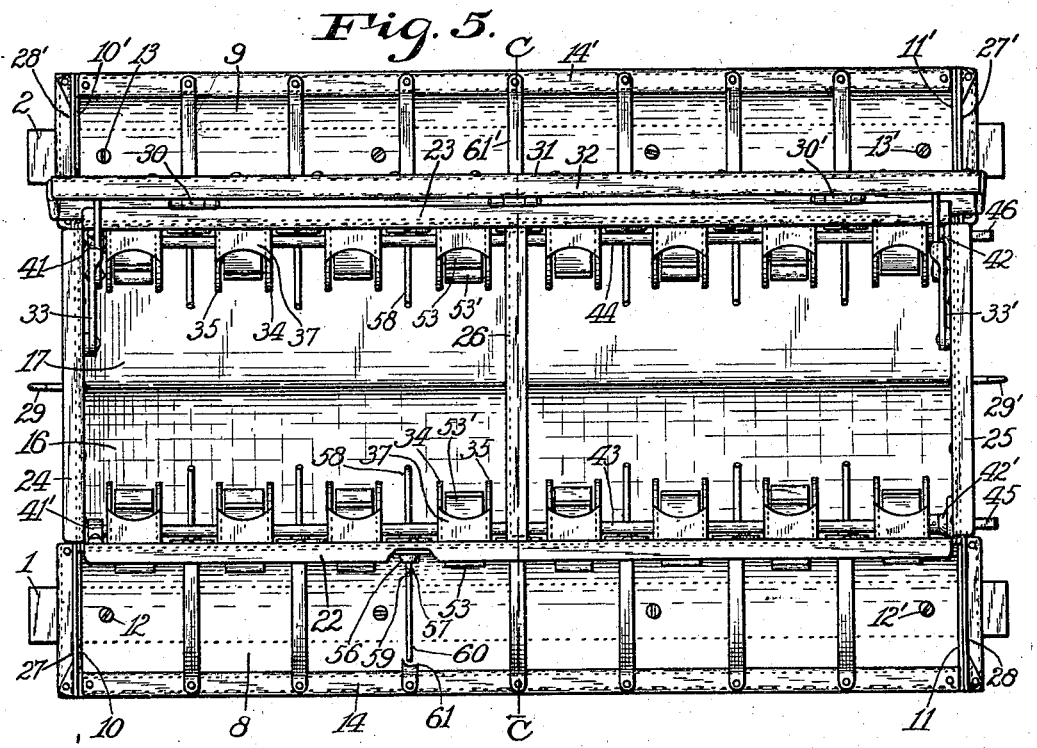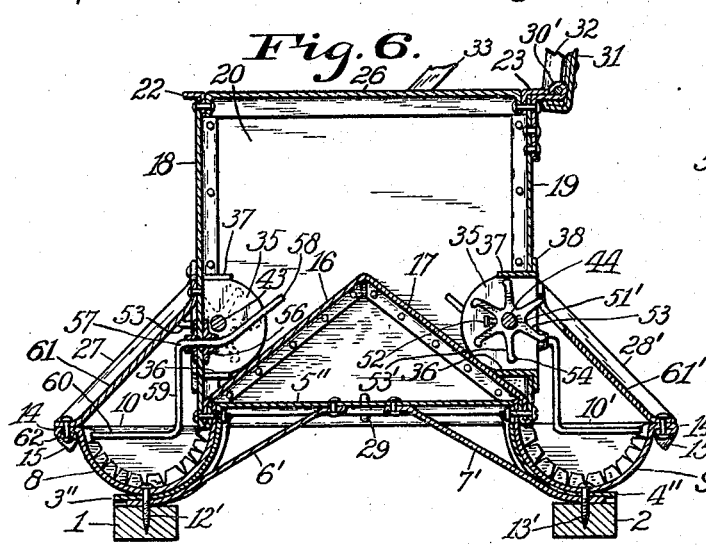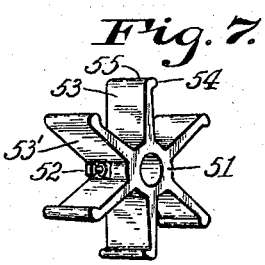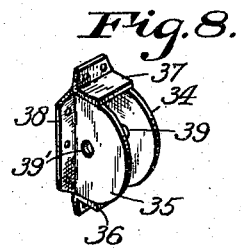

GEORGE W. HAHN, OF INDIANAPOLIS, INDIANA.

LIVE-STOCK FEEDER.

1,185,310.  Specification of Letters Patent.  Patented May 30, 1916.

Application filed October 23, 1914. Serial No. 868,180.

*To all whom it may concern:*

Be it known that I, GEORGE W. HAHN, a citizen of the United States, residing at Indianapolis, in the county of Marion and State of Indiana, have invented a new and useful Live-Stock Feeder, of which the following is a specification, reference being had to the accompanying drawings and to the letters and figures of reference marked thereon.

This invention relates to a feeder that is designed for controlling the feeding of animals such as swine or sheep, the invention having reference more particularly to a portable feeder.

An object of the invention is to provide a feeder for live stock that shall be so constructed as to be adapted to be controlled at will, or to permit the animals to obtain as much food as they may desire.

Another object is to provide a portable live stock feeder that shall be of compact construction and capable of feeding a large number of animals at a time.

A still further object is to provide an improved live stock feeder for out-door or field use of such construction that the feed shall be protected from the rain or snow and kept in clean and sanitary condition, and which shall be durable and economical in use.

With the above-mentioned and other objects in view the invention consists in a feed-bin provided with novel devices for discharging and controlling the discharge of feed, the invention including also a novel trough for receiving the feed for the animals.

Also, the invention consists further in the novel parts, and combinations and arrangements of parts, as hereinafter particularly described and further defined in the accompanying claims.

Referring to the drawings,—Figure 1 is a side elevation of the improved live stock feeder as preferably constructed; Fig. 2 is an end elevation of the feeder; Fig. 3 is a fragmentary section on the line A A on Fig. 2; Fig. 4 is a fragmentary section approximately on the line B B on Fig. 2; Fig. 5 is a top plan of the feeder, the lid thereof being in open position; Fig. 6 is a transverse section approximately on the line C C on Fig. 5; Fig. 7 is a perspective view of the improved feeding device; and Fig. 8 is a perspective view of the casing of the feeding device.

Similar reference characters on the different figures of the drawings indicate like elements or features of construction herein referred to.

The improved feeder as preferably constructed, so as to be portable, comprises two runners or sills 1 and 2. A suitable number of arches or bents are provided which comprise curved legs 3, 3', 3", arranged upon the runner or sill 1, and similar but reversely arranged legs 4, 4', 4", seated upon the runner or sill 2, and beams 5, 5', 5", each integrally connected to the normal upper portions of two legs, being preferably composed of channel-section iron or steel arranged with the flanges or wings undermost. Angle braces 6, 6', and oppositely arranged braces 7, 7', are secured to the beams, one set of braces extending to the runner 1 and the other set to the runner 2 and between the flanges or wings of the foot portions of the adjacent legs. A trough 8 is seated upon the legs that are arranged upon the runner 1, a trough 9 being seated upon the legs that are arranged upon the runner 2, one trough having end members 10 and 11 and the other having end members 10' and 11'. One trough is secured to the runner by means of screws 12, 12', that extend through the bottom of the trough and also through the foot portions of the supporting legs and the adjacent braces, the remaining trough being similarly secured by means of screws 13, 13' to the other runner. The outer upper edge of one trough is provided with an outwardly extending flange 14, the other trough having a similar flange 14', the metal of which the flanges are formed being turned downward and backward to form moldings 15, 15', so that the flanges have relatively thick outer portions that are not likely to cause injury to the animals when feeding. A cone-shaped bin floor is provided which comprises two inclined portions 16 and 17, the lower end of one portion being connected to the inner upper edge of one trough and to one set of the arch legs, the other portion being connected to the inner upper edge of the other trough and to the remaining set of legs adjacent to the ends of the beams, the beams forming portions of the floor to prevent spreading of the lower ends thereof, The feed bin comprises two sides 18 and 19 corresponding to the troughs in length and secured to the lower ends of the inclined portions of the floor, and relatively narrow ends 20 and 21 connected to the sides and also to the floor. The tops of the sides are provided with reinforcing rails 22 and 23, the ends having reinforcing rails 24 and 25, respectively, and preferably a tie bar 26 is connected to the sides of the bin intermediately of its ends.

Preferably two braces 27 and 28 are secured to the outer corners of one trough, and similar braces 27' and 28' are connected to the corners of the remaining trough, each brace being secured to an adjacent portion of the bin.

One end of the structure is provided with a suitable draft device 29, the opposite end being provided with a similar device 29', the draft devices being secured preferably to the beams of the arches.

One side of the bin is provided with hinges 30, 30' to which a lid 31 is connected and normally covering the bin, the lid having a flange 32 that extends about the top of the bin so as to exclude rain or snow from the feed. The lid is provided with suitable folding links 33, 33' for preventing the lid from swinging over and downward when raised to open position.

For the purpose of normally retaining the feed in the bin and controlling the discharge thereof into the troughs, a suitable number of casings are provided in which to mount feed controlling wheels in each of the longer sides 18 and 19 of the bin. Each casing preferably comprises two side walls 34 and 35, a bottom 36 and a top 37, the casing having a suitable flange 38 for securing it to the side of the bin, the side walls of the casing having journal bearings 39 and 39' therein respectively. Each casing is arranged on the interior of the bin in such manner as to provide an outlet aperture 40, the floor or slide for the feed being formed by the bottom 36 of the casing. Two journal boxes 41 and 41' are secured to the longer sides of the bin adjacent to one of the shorter ends, two other journal boxes 42 and 42' being secured to the opposite shorter end 21 of the bin adjacent to the longer sides, respectively. A shaft 43 is rotatably mounted in the journal boxes 41' and 42' and extends through the casings that are attached to the adjacent side of the bin, a similar shaft 44 being rotatably mounted in the journal boxes 41 and 42 and extending through all the casings that are secured to the adjacent side of the bin. The shafts extend through the end 21 of the bin and have squared portions 45 and 46, respectively, that are provided with locking bars 47 and 48 connected to the end 21 by means of pivots 49 and 49', respectively. A crank 50 is provided which is adapted to be applied to either one of the squared end portions, for rotating the shafts when the latter are unlocked. A suitable number of feed-wheels of identical form are provided, one in each of the casings, there being a plurality of feed-wheels on the shaft 43 and a plurality on the shaft 44. Each feed-wheel comprises a hub 51 or 51' that is rotatable on its supporting and controlling shaft and provided with a set screw 52 whereby the hub may be fixedly secured to the shaft. Each hub has a suitable number of radially arranged blades 53, 53' thereon, preferably six in number and of suitable length to draw the feed from the inclined bottom of the bin outward over the bottom 36 of the casing, the outer or forward facing portion of each blade preferably having a projection or rib 54 thereon adapted to dig into the feed and draw it outward, the back or following portion 55 of the blade being thus thickened and rounded so as to not injure the nose of the animal when attempting to rotate the wheel.

In order to enable the animals to agitate the grain or other food on the floor of the bin and prevent it from becoming packed so as to not gravitate to the outlet apertures, each side of the bin is provided with a suitable number of journal boxes 56, one between each two casings, and each journal box supports a rock-shaft 57 that has an arm 58 on its inner end extending upward opposite to the adjacent portion of the floor of the bin, the outer end of the rock-shaft having a downward extending operating arm 59 thereon that extends into the adjacent trough, the end of the arm having a handle portion 60 thereon that extends nearly to the forward edge of the trough.

One trough is provided with a suitable number of partitional braces 61, the other one being provided with similar braces 61', each brace being secured to the bin between two outlet apertures and also to the flange of the adjacent trough, the flange preferably being stiffened where the braces are connected thereto by doubling the metal of which they are formed, as at 62.

The improved feeder may be variously modified as to details and obviously may be extended in length so as to be adapted to feed a relatively greater number of animals than indicated, within the scope of the appended claims.

In practical use the improved feeder is drawn to a convenient position, and obviously may be arranged on the line of a fence so that one of the troughs may be in one field while the other through is in an adjoining field where different animals may be separately fed. The grain or other foodstuff is readily placed in the bin when the lid thereof is opened and therefore may be fully protected. If it is desired to limit small pigs to limited quantities of food, the feed-wheels are secured to their shafts and the latter are rotated until the desired quantity is fed out into the troughs, the shafts being subsequently locked to prevent the animals from turning the feed-wheels. When it is desired to fatten animals, especially hogs, and permit them to eat at will, the feed wheels are loosened on their shafts so that they may be readily rotated independently. Each animal after having eaten what may be in the trough at which it is feeding naturally licks the feed appearing in the orifice of the outlet aperture, and desiring more, quite naturally pushes its nose upward against one of the blades which projects beyond the aperture, so that the feed-wheel is turned and feeds out more grain or food, the latter falling into the trough. As the animals lick the feed from the troughs they push the handles 60 of the agitators, one animal pushing it in one direction, the next adjacent animal pushing it in the opposite direction so that clogging or packing of the grain is prevented. The partitional braces prevent the animals from crowding each other. Slop feed or water may be poured directly into the troughs when such is desired, and may be mixed with suitable dry feed from the bin, as will be obvious.

Having thus described the invention, what is claimed as new is—

1. A live stock feeder including a bin having an outlet aperture in the side wall thereof, a trough below the aperture, a feed-wheel in the aperture rotatably supported by the wall above the trough, and means for locking the feed-wheel stationarily.

2. A live stock feeder including a bin having an outlet aperture in the side wall thereof, a trough below the aperture, and a feed-wheel in the aperture rotatably supported by the wall above the trough and comprising radial blades having each a projecting rib on the advance side of its end portion, the end and the following opposite side being rounded.

3. A live stock feeder including a bin comprising a wall having an outlet aperture therein, a trough below the aperture, a shaft rotatably supported by the wall and extending across the aperture, a feed-wheel in the aperture above the trough and rotatably mounted on the shaft, a device for fixedly securing the feed-wheel to the shaft, and means for stationarily securing the shaft with respect to the wall of the bin.

4. A live stock feeder including a bin provided with a plurality of casings forming outlets, a shaft rotatable in all the casings, means for locking the shaft against rotation, feed-wheels in the casings respectively and rotatable on the shaft, each feed-wheel being provided with a device for fixedly securing it to the shaft and having blades projectable beyond the exterior of the casing, and a trough extending below the orifices of the casings.

5. A live stock feeder including a bin having an outlet aperture in the side wall thereof, a feed-wheel rotatable in the aperture, a trough below the aperture, a rock-shaft mounted in the wall adjacent to the feed-wheel, an agitator arm on the inner end of the rock-shaft, extending upwardly, and an operating arm on the outer end of the rock-shaft extending downward into the trough, and a handle on the operating arm extending horizontally toward the front of the trough.

6. A live stock feeder including two troughs provided with connecting arches supporting the troughs, a bin conected to the troughs and also connected to and supported by the arches and having outlet apertures above the troughs, each aperture being provided with a casing, two shafts rotatably mounted in two different series respectively of the casings, feed-wheels rotatable on the shafts in the casings and provided each with a device for fixing it to its shaft, means for rotating the shafts, and means for locking the shafts.

7. A live stock feeder including a bin comprising an inclined floor and a wall connected to the floor, the wall having a plurality of outlet apertures adjacent to the lower end of the floor, a plurality of feed-wheels rotatably mounted in the apertures respectively, a trough connected to the bin and extending below the apertures, and a shaft rotatively mounted in the wall transversely thereof between two of the outlet apertures and having an agitator arm on the inner end thereof extending upwardly adjacent to the inclined floor to swing toward or from the adjacent feed-wheels, the shaft having also an operating-arm extending downward into the trough.

8. In a live stock feeder, the combination of a plurality of sills, a plurality of arches having curved legs secured to the sills, draft devices connected to the outer ones of the arches, a plurality of troughs secured upon the legs of the arches, a bin mounted on the arches and connected to the upper inner portions of the troughs, the bin having outlets above the troughs, partitional braces secured to the troughs and to the bin between the outlets, and feed-wheels rotatably mounted in the outlets.

9. In a live stock feeder, a bin comprising a plurality of horizontal beams, a floor comprising two oppositely inclined portions connected at their lower ends respectively to the ends of the beams, two vertical side walls connected to the lower ends of the two inclined floor portions respectively, each side wall having a plurality of outlets, and two end walls connected to opposite portions of the floor and the side walls respectively and having their lower ends on the plane of the beams, in combination with a plurality of feeding devices in the outlets.

10. In a live stock feeder, the combination of a plurality of arches comprising each a horizontal beam having curved legs, each leg having a horizontally extending foot on its end, a plurality of braces secured to the beams and also to the legs of the arches, two troughs arranged above the two runners respectively, one trough being seated upon and secured to one of the legs and the foot thereof of each of the arches, the remaining trough being seated upon and secured to the other of the legs and the foot thereof of the arches, a floor secured to the arches and extending to the troughs, walls secured to the floor and having outlets therein above the troughs, and movable feeders in the outlets.

11. In a live stock feeder, the combination of two troughs provided with arches connected to and supporting the troughs, a bin connected to the troughs and also connected to and supported upon the arches and having outlet apertures above the troughs, the bin bottom comprising two oppositely inclined portions extending upwardly from the bottoms of the apertures, two shafts rotatably mounted on the bin and extending across two different series respectively of the apertures, the shafts extending through one end of the bin and having squared end portions, and feed-wheels rotatable on the shafts in the apertures and provided each with a device for fixing it to its shaft.

In testimony whereof I affix my signature in presence of two witnesses.

GEORGE W. HAHN.

Witnesses:
E. T. SILVIUS,
J. H. GARDNER.

Copies of this patent may be obtained for five cents each, by addressing the "Commissioner of Patents, Washington, D. C."